United States Patent [19]

Ochiai et al.

[11] Patent Number: 5,077,566

[45] Date of Patent: Dec. 31, 1991

[54] IMAGE FORMING APPARATUS

[75] Inventors: Toshihiko Ochiai, Tokyo; Hakaru Muto, Yokohama; Tetsuya Kobayashi, Yokohama; Yujiro Ando, Yokohama, all of Japan

[73] Assignee: Canon Kabushiki Kaisha, Tokyo, Japan

[21] Appl. No.: 554,901

[22] Filed: Jul. 20, 1990

[30] Foreign Application Priority Data

Jul. 21, 1989 [JP] Japan .................................. 1-187437

[51] Int. Cl.[5] ........................ G01D 15/06; G03G 21/00

[52] U.S. Cl. .................................. 346/153.1; 355/301

[58] Field of Search .............................. 346/153.1-155; 355/301-305

[56] References Cited

U.S. PATENT DOCUMENTS 4,533,149 11/1985 Yano ................................ 346/153.1

4,989,021 1/1991 Ochiai et al. ...................... 346/160.1

4,989,039 1/1991 Hayashi et al. ................. 346/160 X

*Primary Examiner*—George H. Miller, Jr.

*Attorney, Agent, or Firm*—Fitzpatrick, Cella, Harper & Scinto

[57] ABSTRACT

An image forming apparatus includes recording electrodes electrically isolated from each other; a recording medium movable relative to the recording electrodes; developer supplier for supplying a conductive developer into between the recording electrodes and the recording medium; developer remover contactable to the recording medium to remove the developer from the recording medium; humidity detector for detecting an ambient humidity; and a bias applying device for applying a different bias voltage to the developer remover in accordance with an output of the humidity detector.

11 Claims, 6 Drawing Sheets

IMAGE FORMING APPARATUS

FIELD OF THE INVENTION AND RELATED ART

The present invention relates to an image forming apparatus for forming an image on a recording medium by electrostatically depositing a developer.

Various types of image forming apparatus have been proposed to form an image in accordance with image information. Among them, there is a type wherein a fine powder developer comprising conductive magnetic toner is electrostatically deposited on the recording medium to form an image.

Japanese Patent Application Publication No. 46707/1976 discloses an example of such a type of image forming apparatus.

Referring first to FIG. 9, this publication discloses that the conductive and magnetic toner 51 having a volume resistivity of $10^3$–$10^9$ ohm.cm is carried on an outer periphery of a non-magnetic cylinder 50 by magnetic field provided by a rotating magnet 52 coaxially provided with the non-magnetic cylinder 50. Recording electrodes 53 are disposed at a high density along a longitudinal direction on the outer periphery of the non magnetic cylinder 50. A voltage corresponding to the image information is applied to the electrodes 53 from a record controller.

A recording medium 54 has a laminated structure having a conductive layer 54*b* and an insulating layer 54*a* in this order from the inside. The recording medium 54 is provided close to the non-magnetic cylinder 50. A voltage is applied between the conductive layer 54*b* and the electrodes so that the toner 51 is deposited on the insulating layer 54*a* having a volume resistivity of $10^7$–$10^{16}$, preferably $10^9$–$10^{13}$ ohm.cm.

As shown in FIG. 10, the toner 57 is supplied to the recording electrode 52 by the rotation of the magnet roller 55, the toner is selectively deposited on the recording medium 54 supplied to the position where it is opposed to the recording electrode 56, in accordance with the signal to the recording electrode 56.

When a signal voltage of +40 V is supplied from the controller 58, the toner 58 is deposited on the recording medium 54, whereas when it is 0 V, the toner is not deposited. By repeating the operation, a desired image corresponding to the recording signal is formed.

The toner 57 deposited on the recording medium 54 is used to display the information at the display region 59, and thereafter, the toner is removed from the recording medium by cleaning means (toner removing means) 60 made of conductive carbon fibers, conductive resin, conductive rubber or the like, by which the toner falls on the magnet roller 55. The toner is conveyed again and used in the next recording.

In the prior art, there is a liability that the surface of the recording medium 54 is contaminated with the result of production of foggy background, when the recording medium 54 is cleaned by the cleaning member 60. This is considered as being because when the cleaning member 60 is rubbed with the cleaning member 60 to be cleaned, triboelectric charge occurs on the recording medium 54, and the triboelectric charge attracts the toner 57 when the electric charge passes by the vicinity of the magnet roller 55.

The production of the foggy background is easily influenced by ambient humidity, more particularly, it is increased with decrease of the humidity, because the triboelectric charge increases therewith.

It is considered that the foggy background is avoided by applying a bias voltage to the cleaning member 60, the bias voltage having a polarity opposite to the triboelectric charge polarity of the recording medium 54. However, if the bias voltage is selected to avoid the foggy background under the low humidity ambient condition, the voltage applied to the cleaning member 60 is too high under the high humidity condition, with the result of liability that the electric charge is injected from the cleaning member 60 to the recording medium 54, which leads to production of the foggy background.

SUMMARY OF THE INVENTION

It is a principal object of the present invention to provide an image forming apparatus which is not influenced by the ambient humidity.

It is another object of the present invention to provide an image forming apparatus without production of the foggy background, irrespective of the ambient humidity.

It is another object of the present invention to provide an image display apparatus in which the foggy background is not produced, irrespective of the humidity condition.

According to an aspect of the present invention, there is provided an image forming apparatus, comprising: recording electrodes electrically isolated from each other; a recording medium movable relative to said recording electrodes; developer supply means for supplying a conductive developer into between said recording electrodes and said recording medium; developer removing means contactable to said recording medium to remove the developer from said recording medium; humidity detecting means for detecting an ambient humidity; and bias applying means for applying a different bias voltage to said developer removing means in accordance with an output of said humidity detecting means.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The preferred embodiments of the present invention will be described in conjunction with the accompanying drawings.

Figure 1:
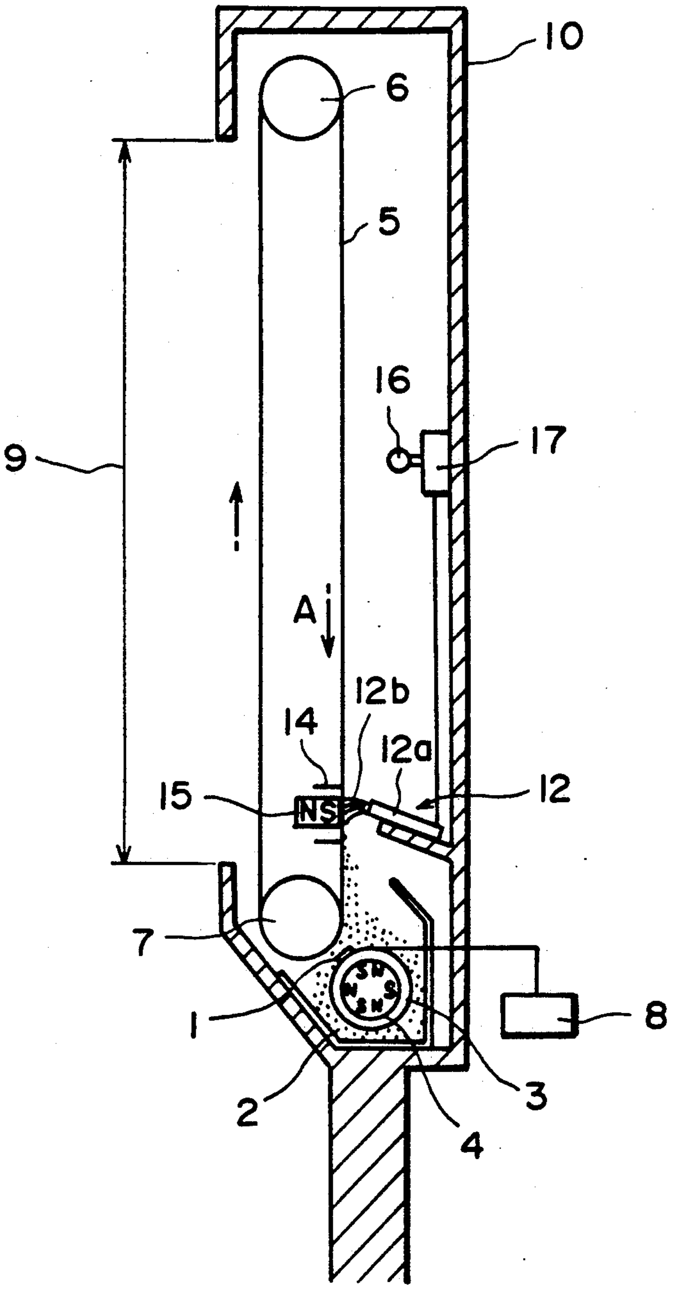
FIG. 1 is a sectional view of an image forming apparatus according to an embodiment of the present invention.
Figure 2:
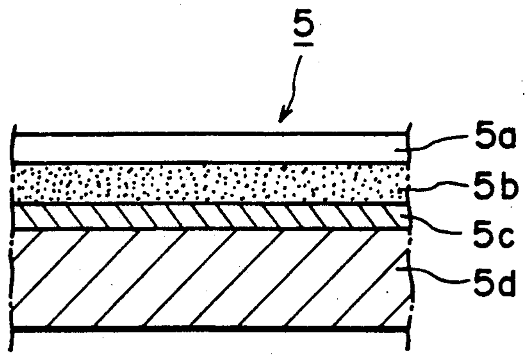
FIG. 2 is an enlarge sectional view of a recording medium used in the apparatus of FIG. 1.
Figure 3:
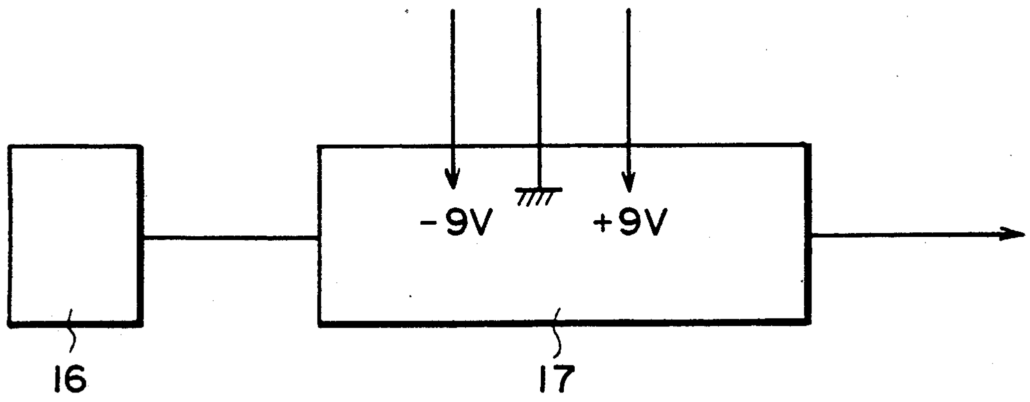
FIG. 3 is a block diagram of detecting means for detecting the humidity in the apparatus.
Figure 5:
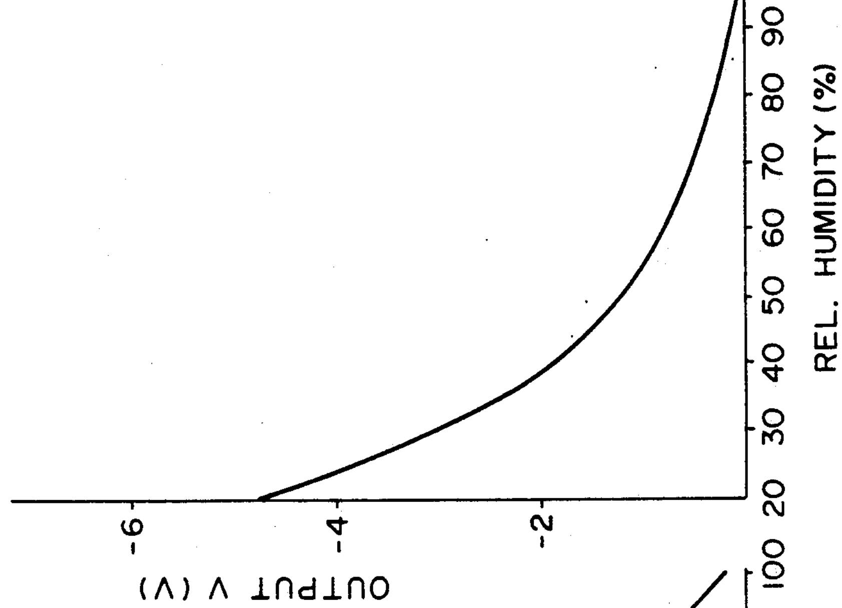
FIG. 5 illustrates characteristics of bias means.
Figure 4:
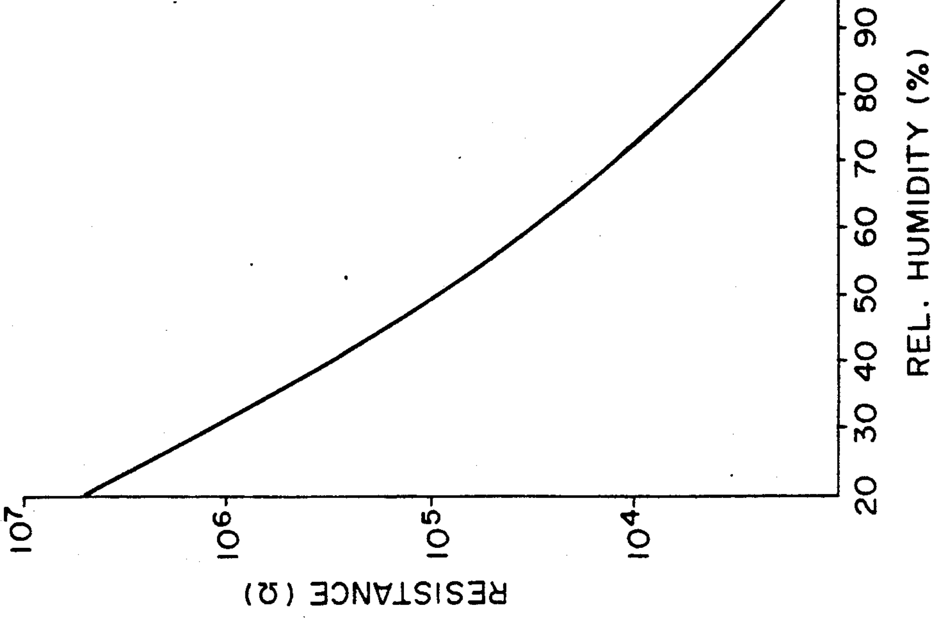
FIG. 4 illustrates characteristics of said detecting means.
Figure 6:
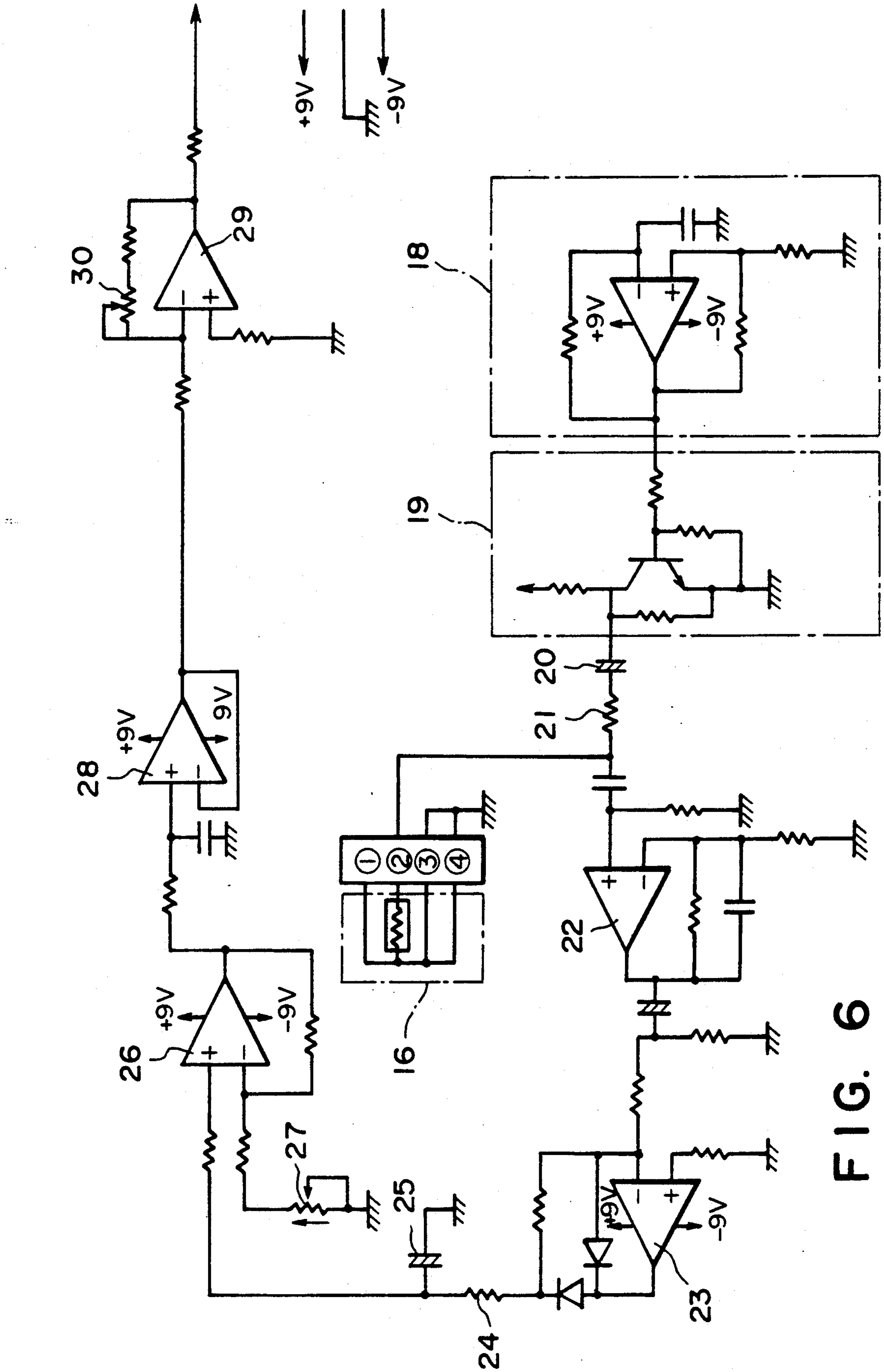
FIG. 6 is a circuit diagram of said detecting means and bias means.

FIG. 1 is a sectional view of an image forming apparatus according to an embodiment of the present invention. FIG. 2 is an enlarged sectional view of a recording medium used in the apparatus of FIG. 1. FIG. 3 is a block diagram of detecting means for detecting humidity in the apparatus. FIG. 3 is a block diagram of detecting means for detecting the humidity in the apparatus. FIG. 4 illustrates characteristics of said detecting means. FIG. 5 illustrates characteristics of bias means. FIG. 6 is a circuit diagram of said detecting means and bias means.

Referring first to FIG. 1, the image forming apparatus according to an embodiment of the present invention will be described.

The apparatus comprises recording electrodes for selectively charging the developer in accordance with image information, and a non-magnetic cylinder 3 for supplying conductive and magnetic developer (toner) 2. The electrodes 1 are arranged in the longitudinal direction of the non-magnetic cylinder 3 adjacent the outer periphery thereof at a high density.

A rotational magnet 4 is coaxially disposed with respect to the non-magnetic cylinder 3. The toner 2 is conveyed on the outer periphery of the non-magnetic cylinder 3 by the magnetic field of the rotational magnet 4.

A recording sheet 5 is in the form of an endless belt and functions as a recording medium on which the toner 2 is deposited in the form of an image. The recording electrodes 1 are faced close to a part of the recording sheet 5. The recording sheet 5 is stretched between a driving roller 7 and a tension roller 6 (conveying means) disposed at the top and bottom of the apparatus. The driving roller 7 is rotated at a speed of 130 mm/sec by an unshown driving motor to convey the recording sheet 5 in a direction indicated by an arrow.

The recording electrodes 1 are connected to a record controller 8, which applies thereto voltages (20-40 V) in accordance with the image information. The record controller 8 applies the voltage in accordance with the image information to the conductive layer of the recording sheet 5, by which the toner 2 is deposited on the insulating layer to form an image.

The recording sheet 5 is conveyed in the direction A by the rotation of the driving roller 7, so that the image formed on the recording sheet 5 is displayed externally at the image display station 9. The recording sheet 5 having passed through the display station 9 is subjected to a cleaning operation by a cleaning member 12 fixed through a mounting member 11 on the back plate 10 of the apparatus, so that the toner 2 is scraped off the sheet. The toner 2 falls on the non-magnetic cylinder 3, and is prepared to be used for the next image formation.

The cleaning member 12 comprises a frame 12*a* and conductive brush 12*b* of soft material made of carbon fibers having a volume resistivity of $10^0$–$10^3$ ohm.cm. The brush 12*b* rubs the recording sheet 5 with a proper angle and distance to scrape the toner 2 off the recording sheet onto the non-magnetic cylinder 3.

Examples of other materials for the cleaning member 12 are soft plastic material having conductive property containing conductive material (polyethylene (polypropylene), urethane rubber, silicone or the like.

At a position where the cleaning member 12 is contacted to the recording sheet 5, there are non-magnetic member 14 and a magnet 15 for supporting the recording sheet 5 at the backside of the recording sheet 5.

On the back plate 10 of the apparatus, there are mounted a humidity sensor 16 functioning as detecting means for detecting the humidity in the apparatus, a sensor control board 17 for applying a bias voltage having an opposite polarity from the electric charge on the recording sheet 5, to the recording member 12 in accordance with the humidity.

The humidity sensor 16 provides a different resistance in accordance with the humidity in the apparatus, and the sensor control board 17 converts the change in the resistance into a voltage.

On the sensor control board 17, the frame 12*a* of the cleaning member is connected, and the sensor control board 17 applies to the cleaning member 12 a bias voltage in accordance with a humidity detected by the humidity sensor 16, so that the charge hysteresis on the recording sheet 5 is erased.

Referring to FIG. 2, the description will be made as to the structure of the recording sheet 5 used in the image forming apparatus constructed in the manner described above.

The recording sheet 5 comprises a surface layer 5*a*, a color layer 5*b*, a conductive layer 5*c* and a base layer 5*d*.

The surface layer 5*a* is made of transparent material having a volume resistivity of $10^9$–$10^{13}$ ohm.cm comprising as a main component butyral resin, phenol resin, urethane resin or the like. The color layer 5*b* is made of inorganic material having a color and a binder (acrylic resin, plastic resin). The conductive layer 5*c* is evaporated and made of aluminum or ITO (oxide of indium and tin) having a volume resistivity of $10^0$–$10^2$ ohm.cm to provide the electric conductivity. The base layer 5*d* is made of plastic resin material such as polyethylene terephthalate, polyethylene, polypropylene or the like.

The surface layer 5*a* and the color layer 5*b* are electrically isolated. The coloring layer 5*b* is made, in this embodiment, of inorganic material such as titanium oxide ($TiO_2$) or aluminum oxide ($Al_2O_3$) to provide a white background.

Referring to FIGS. 3, 4, 5 and 6, the description will be made as to the detecting means for detecting the humidity in the apparatus and bias means for applying a bias voltage to the cleaning means, disposed in the image forming apparatus.

Referring to FIG. 3, the output of the temperature sensor 16 is supplied to the sensor control board 17. The sensor control board 17 is supplied with a voltage which is either +9 V or −9 V from an unshown voltage source. The output of the sensor control board 17 is connected to the frame 12A of the cleaning member.

FIG. 4 is a graph illustrating the relationship between the relative humidity and the resistance in the humidity sensor 16. FIG. 4 shows that the resistance is low when the humidity is high, the resistance is high if the humidity is low.

FIG. 5 is a graph showing a relationship between the relative humidity and an output voltage by the sensor control board 17.

As will be understood from FIG. 5, the output voltage applied to the cleaning member 12 is high if the humidity is high, and is low if the humidity is low. In this embodiment, the recording sheet 5 is made of butyral resin or the like and titanium oxide or the like, and the cleaning member 12 is made of conductive carbon fibers or the like, and therefore, the electric charge produced on the recording sheet 5 by the friction with the cleaning member 12 is positive. In view of this, the polarity of the bias voltage supplied from the center control board 17 to the cleaning member 12 is negative, by which the electric charge produced on the recording sheet 5 is erased.

FIG. 6 is a circuit diagram of the humidity sensor 16 and the sensor control board 17.

It includes an oscillation circuit for producing the signal voltages at a frequency of approximately 1 KHz. It also includes an amplifier 19 to amplify the oscillated waveform of the signal voltage supplied from the oscillation circuit 18. The output voltage of the amplifier 19 is supplied to a capacitor 20 which removes the DC component, and the output therefrom is divided in the voltage and supplied to the humidity sensor 16 and the operational amplifier 22.

The signal voltage supplied to the operational amplifier 22 is amplified and is deprived of the noise component. The output voltage amplified by the operational amplifier 22 is subjected to a whole wave rectification by the operational amplifier 23, and is smoothed by a smoothing circuit having a resistance 24 and a capacitor 25, into a DC voltage which is then supplied to an operational amplifier 26. At this time, the error of the input voltage due to the circuit is removed by a variable resistor 27, and the amplified output voltage is supplied to a buffer amplifier 28. The output voltage which has been current-amplified by the buffer amplifier 28 is reversed and supplied to an operational amplifier 29, so that an output voltage having a polarity opposite to that of the input voltage is applied to the cleaning member 12. In the operational amplifier 29, the variable resistor 30 is effective to change the amplification ratio of the operational amplifier 29.

By properly selecting the resistance of the resistor 21 in the circuit, the output property (FIG. 5) can be conformed with the charging property of the recording sheet 5, so that the charge hysteresis of the recording sheet 5 can be erased.

Other Embodiments

Figure 7:
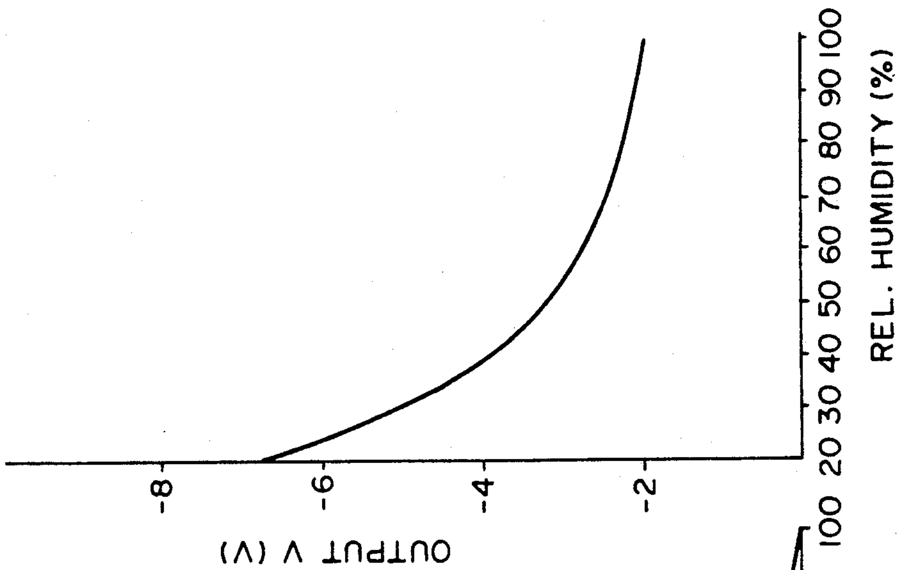
FIGS. 7 and 8 shows other embodiments.
Figure 8:
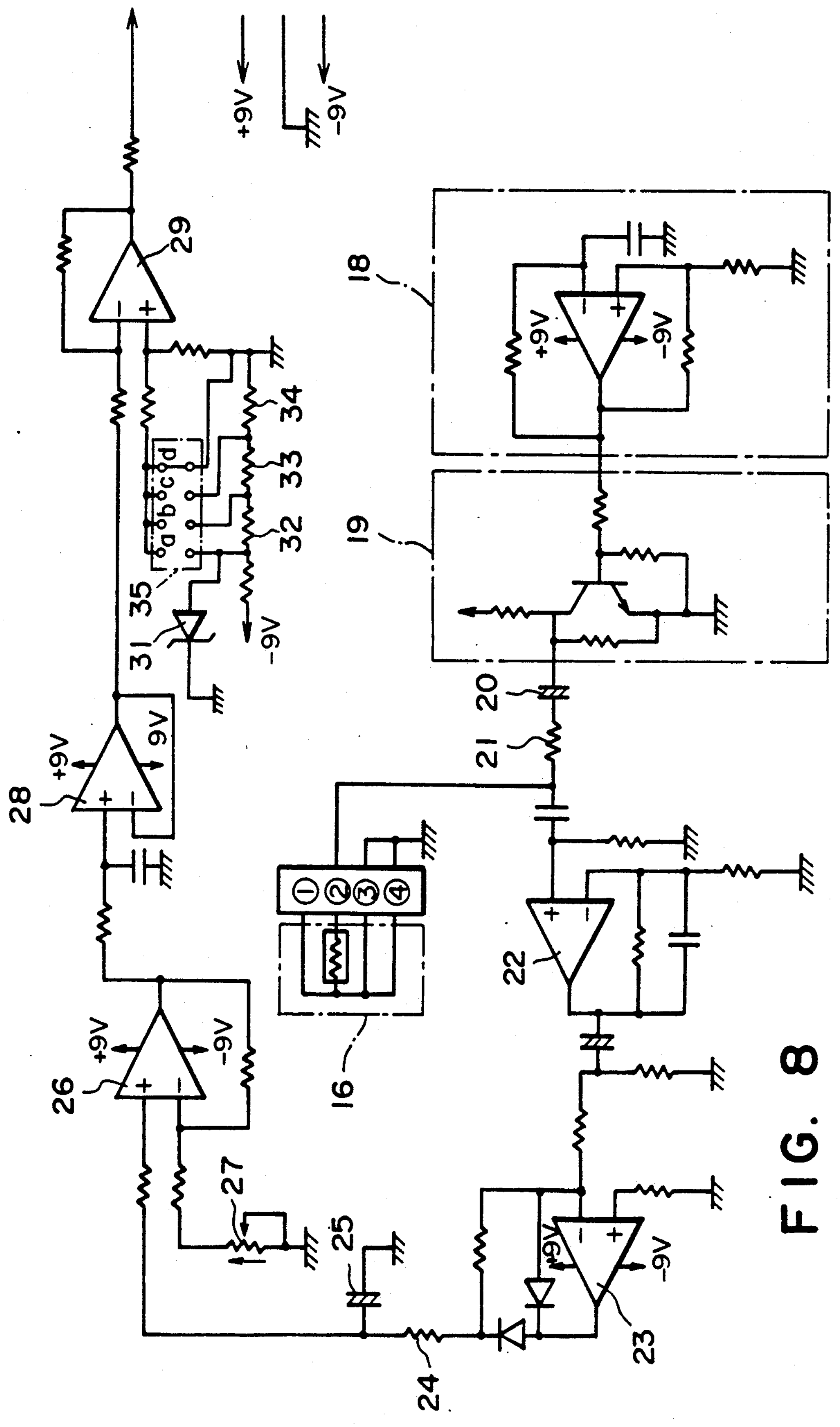
Figure 9:
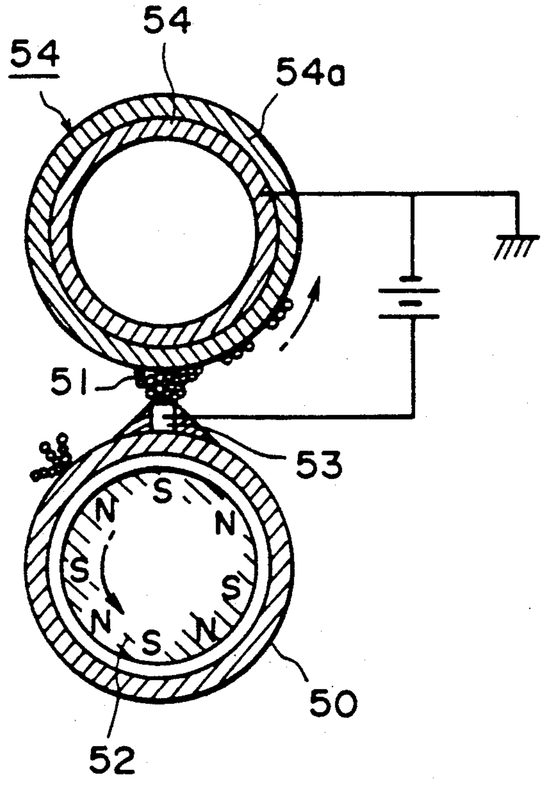
FIG. 9 PRIOR ART
FIGS. 9 and 10 illustrates conventional apparatus.
Figure 10:
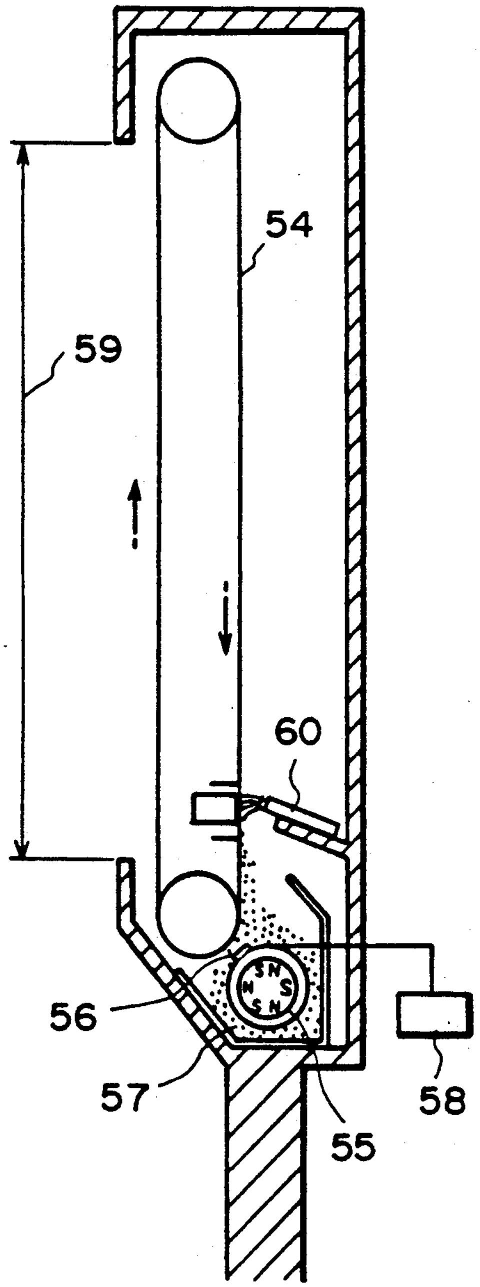
FIG. 10 PRIOR ART

Referring to FIGS. 7 and 8, the description will be made as to another bias means for changing the bias voltage applied to the cleaning means in accordance with the humidity by the humidity sensor used in the above-described embodiment.

FIG. 7 is a graph showing the relationship between the relative humidity and the output voltage in the sensor control board 17.

In this embodiment, as shown in FIG. 7, the output voltage is added by an off-set (DC) of −2 V. This is done in order to maintain at all times the electric field intensity applied across the thicknesses of the butyral resin and the titanium oxide layers constituting the recording sheet 5.

FIG. 8 is a circuit diagram of the humidity sensor 16 and the sensor control board 17 in this embodiment. This is different from the foregoing embodiment in that a circuit for applying the off-set voltage is connected to non-reversing input terminal of the operational amplifier 29.

Resistors 32, 33 and 34 are connected in series to a zener diode 31 to backup a constant voltage. The resistances of the resistors 32, 33 and 34 are changed by a jumper connector 35 in the order of contacts a, b, c and d, so that the input voltages of −3 V, −2 V, −1 V and 0 V are selectively provided.

With the above structure, when the differential input voltage of the operational amplifier 29 in a circuit of the sensor control board 17 is zero, the output voltage can be made zero, so that the variation in the output voltage can be prevented to assuredly erase the charge hysteresis of the recording sheet 5.

As described in the foregoing, according to the present invention, the bias voltage applied to the cleaning means is changed in accordance with the humidity detected by the humidity detecting means, so that the production of the foggy background can be prevented in the above-described type of the image forming apparatus. The foggy background is otherwise liable to be formed because the triboelectric charge by the friction between the cleaning means and the recording medium can attract the conductive toner in the background area of the recording medium.

Particularly, the triboelectric charge can be prevented under such a low humidity (not more than 30%), the triboelectric charge can be prevented, so that the image quality can be improved.

In addition, where an off-set voltage is added to the bias voltage applied to the cleaning means, the variation in the bias voltage supplied by the bias means can be prevented, so that the charge hysteresis on the recording medium having the high resistivity can be assuredly erased.

Without this, there is a liability that the electric charge by the cleaning means acts like the record signal voltage to attract the conductive toner onto the recording medium. This problem peculiar to the above-described type of the image forming apparatus can be prevented.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
recording electrodes electrically isolated from each other;
a recording medium movable relative to said recording electrodes;
developer supply means for supplying a conductive developer between said recording electrodes and said recording medium;
developer removing means contactable to said recording medium to remove the developer from said recording medium;
humidity detecting means for detecting an ambient humidity; and
bias applying means for applying a different bias voltage to said developer removing means in accordance with an output of said humidity detecting means.

2. An apparatus according to claim 1, wherein said developer removing means includes a conductive brush.

3. An apparatus according to claim 2, wherein said developer removing means is made of soft brush.

4. An apparatus according to claim 3, wherein said developer removing means is made of carbon fibers.

5. An apparatus according to claim 1, wherein the developer is magnetic and is conveyed by magnetic force provided by said developer supplying means.

6. An image forming apparatus, comprising:
recording electrodes electrically isolated from each other;

a recording medium movable relative to said recording electrode;

developer supplying means for supplying a conductive developer between said recording electrodes and said recording medium;

developer removing means contactable to said recording medium to remove the developer from said recording medium;

humidity detecting means having an element exhibiting resistivity which differs in accordance with an ambient humidity; and bias applying means, responsive to an output of said humidity detecting means, to apply to said developer removing means a voltage which increases with increase of the humidity.

7. An apparatus according to claim 6, wherein said recording medium is made of an insulating material at least at a part to which the developer is supplied, and wherein said developer removing means is made of soft brush.

8. An apparatus according to claim 7, wherein said developer is magnetic and is conveyed by magnetic force provided by a magnetic pole of said developer supply means.

9. An image forming apparatus, comprising: recording electrodes electrically isolated from each other;

a recording medium movable relative to said recording electrodes, said recording medium being made of insulating material at least at a side to which a developer is supplied;

developer supplying means for supplying the developer which is electrically conductive between said recording electrodes and said recording medium;

developer removing means, including a soft brush, and contactable to said recording medium to remove the developer from said recording medium;

humidity detecting means for detecting an ambient humidity;

bias voltage application means, responsive to an output of said humidity detecting means, to apply to said developer removing means a voltage which increases with increase of the humidity.

10. An apparatus according to claim 9, wherein the image formed on said recording medium with the developer is used to display the image.

11. An apparatus according to claim 10, wherein the developer removed from said recording medium is repeatedly used for display.

* * * * *

UNITED STATES PATENT AND TRADEMARK OFFICE
CERTIFICATE OF CORRECTION

PATENT NO. : 5,077,566

DATED : December 31, 1991

INVENTOR(S) : Toshihiko Ochiai, et al.

It is certified that error appears in the above-identified patent and that said Letters Patent is hereby corrected as shown below:

Title page item:

[57] ABSTRACT:

Line 5, "into" should be deleted.

COLUMN 2:

Line 61, "shows" should read --show--.
Line 62, "illustrates" should read --illustrate--.

Signed and Sealed this

Sixth Day of July, 1993

Attest:

MICHAEL K. KIRK

*Attesting Officer*

*Acting Commissioner of Patents and Trademarks*